(12) United States Patent
Li et al.

(10) Patent No.: US 9,887,620 B2
(45) Date of Patent: Feb. 6, 2018

(54) POWER CONVERTER

(71) Applicants: Dong-Sheng Li, Taipei (TW);
Kuang-Feng Lin, Taipei (TW);
Ching-Pao Hsiao, Taipei (TW);
Gen-Jie Hsiao, Taipei (TW);
Chen-Sheng Lee, Taipei (TW)

(72) Inventors: Dong-Sheng Li, Taipei (TW);
Kuang-Feng Lin, Taipei (TW)

( * ) Notice: Subject to any disclaimer, the term of this patent is extended or adjusted under 35 U.S.C. 154(b) by 0 days.

(21) Appl. No.: 15/170,955

(22) Filed: Jun. 2, 2016

(65) Prior Publication Data
US 2016/0359405 A1  Dec. 8, 2016

(30) Foreign Application Priority Data
Jun. 5, 2015  (TW) .............................. 104118438 A

(51) Int. Cl.
| H02M 1/32 | (2007.01) |
| H02M 1/36 | (2007.01) |
| H02M 3/156 | (2006.01) |
| H02M 3/158 | (2006.01) |
| H02H 9/00 | (2006.01) |
| H02M 1/00 | (2006.01) |

(52) U.S. Cl.
CPC ................ *H02M 1/36* (2013.01); *H02H 9/00* (2013.01); *H02M 1/32* (2013.01); *H02M 3/156* (2013.01); *H02M 3/158* (2013.01); *H02M 2001/0009* (2013.01)

(58) Field of Classification Search
CPC .......... H02M 1/32; H02M 1/36; H02M 3/156; H02M 3/158
See application file for complete search history.

(56) References Cited

U.S. PATENT DOCUMENTS

| 8,754,606 B2 * | 6/2014 | Xin ....................... F04D 27/004 318/729 |
| 2015/0054489 A1 * | 2/2015 | Lin ................... G01R 19/16538 324/76.11 |

* cited by examiner

*Primary Examiner* — Timothy J Dole
*Assistant Examiner* — Ishrat Jamali

(57) ABSTRACT

The present disclosure illustrates a power converter electrically connected between an external power supply and an electronic device. The electronic device has a first power-inputted terminal. The power converter includes a capacitor, a switch and an inrush-current-limit circuit. The capacitor is electrically connected to the external power supply. The switch has an input terminal electrically connected to an output terminal of the capacitor, and an output terminal electrically connected to the first power-inputted terminal A first voltage detector has an output terminal electrically connected to the switch and configured to detect an output voltage of the capacitor.
When the first voltage detector detects that an input voltage of the switch is higher than a first preset voltage, the switch is set in a conductive status.

10 Claims, 6 Drawing Sheets

POWER CONVERTER

CROSS REFERENCE TO RELATED APPLICATIONS

This non-provisional application claims priority under 35 U.S.C. §119(a) on Patent Application No(s). 104118438 filed in Taiwan, R.O.C. on Jun. 5, 2015, the entire contents of which are hereby incorporated by reference.

BACKGROUND OF THE INVENTION

1. Field of the Invention

The present disclosure relates to a power converter, and more particularly to a power converter equipped with a capacitor inside.

2. Description of the Related Art

Storage devices are important devices for many modern 3C products, such as personal computers, mobile phones, cameras or monitor systems which all need storage devices. The storage device is usually built in the 3C product; alternatively, an easy-carrying mobile storage device is also commercially available, for example, a memory card, a flash disk or a portable hard disk. With advantages of faster transmission speed and larger storage volume, the portable hard disk becomes the widely used mobile storage device, currently.

The commercially available common external hard disks can be classified into 2.5-inch and 3.5-inch sizes of hard disks. For startup, the 2.5-inch hard disk requires lower power than the 3.5-inch hard disk, but in certain applications and designs, two 2.5-inch hard disk must be connected in parallel for operation, which is called as 2-Bay configuration. Currently, during in an initial state of startup, the hard disk requires large current or power which is usually 2 to 4 times of the current required for stable operation, and operation of the hard disk then becomes stable gradually over time and the required current for the hard disk becomes lower and stable gradually. In prior art, an AC-DC adapter is required to provide power to the 3.5-inch hard disk or the 2-bay configuration of 2.5-inch hard disks, so as to solve the problem of instant high-current demand during startup.

However, the adapter may increase the overall cost of the external hard disk. In addition, it is very inconvenient for user to carry the adapter, and using of the adapter may reduce the convenience in plug-and-play function of the external hard disk.

In addition, the electronic device with a USB Type C port can provide power of 5V/1.5 A and 3 A, and the voltage supplied by the USB Type C port can be increased up to 12V through power delivery (PD) communication protocol, but it is not enough for power instantaneously required during startup of the 3.5-inch hard disk or the 2-Bay configuration of 2.5-inch hard disks. Therefore, in prior art, the 3.5-inch hard disk or the 2-Bay configuration of 2.5-inch hard disks is unable to be activated by only power supplied from the USB port.

In order to solve above-mentioned problem, Taiwan patent filing No. 101135837 discloses a technical solution in which a battery is extra disposed inside a case of the portable hard disk to supply power instantaneously required during startup of the portable hard disk. In the technical solution, the external hard disk includes the battery inside rather than using the external adapter, but the designer of the external hard disk must pay more attention in safety and lifetime of the battery and the consumer may raise certain concern about the safety of the battery while purchasing the kind of the external hard disk, which results in lower purchase intention. Therefore, what is needed is to provide a safer and long-lifetime technical solution to activate the portable hard disk by only using a capacitor and the power supplied by the USB port and without using the adapter.

SUMMARY OF THE INVENTION

An object of the present disclosure is to provide a power converter, so that it is not necessary for the external hard disk to connect the extra power converter, and the power converter has advantages of safety, long lifetime and easy carrying.

To achieve the objective, the present disclosure provides a power converter electrically connected between an external power supply and at least one electronic device with peak current load characteristic. The electronic device has a first power-inputted terminal to which a voltage ranged in an operation voltage range is inputted. The power converter includes a capacitor, a switch, an inrush-current-limit circuit and a first voltage detection circuit. The capacitor is electrically connected to the external power supply. The switch has an input terminal electrically connected to an output terminal of the capacitor, and an output terminal electrically connected to the first power-inputted terminal of the electronic device. The inrush-current-limit circuit is electrically connected between the capacitor and the external power supply. The first voltage detection circuit has an output terminal electrically connected to the switch, and configured to detect an output voltage of the capacitor. Under a condition that the first voltage detection circuit detects the input voltage of the switch higher than or equal to a first preset voltage, the first voltage detection circuit is configured to drive the switch into a conductive status, so as to enable the capacitor to supply power to the first power-inputted terminal of the electronic device.

To achieve the objective, the present disclosure provides a power converter electrically connected between an external power supply and at least one electronic device with peak current load characteristic. The electronic device has a first power-inputted terminal which a voltage ranged in an operation voltage is inputted. The power converter includes a capacitor, a switch, an inrush-current-limit circuit and a first timer. The capacitor is electrically connected to the external power supply. The switch has an input terminal electrically connected to an output terminal of the capacitor, and an output terminal electrically connected to the first power-inputted terminal of the electronic device. The inrush-current-limit circuit is electrically connected between the capacitor and the external power supply. The first timer has an output terminal electrically connected to the switch, and an input terminal electrically connected to the external power supply, and stores a first preset time period. When the power converter and the external power supply are connected for a time period longer than or equal to the first preset time period, the first timer drives the switch to be in conduction, so as to enable the capacitor to supply power to the first power-inputted terminal Preferably, the power converter further includes a reset circuit having an output terminal electrically connected to the first timer, and an input terminal electrically connected to the external power supply, and configured to reset the first timer when the reset circuit detects that the external power supply is removed.

Preferably, the power converter further includes a DC/DC converter electrically connected between the inrush-current-limit circuit and the capacitor. The DC/DC converter can be a buck circuit, a boost circuit or a single-ended primary-inductance converter (SEPIC).

For example, it is assumed that the voltage required for the first power-inputted terminal of the electronic device is 12V, and the DC/DC converter is implemented by the boost circuit when the output voltage of the external power supply is lower than 12V; or, the DC/DC converter is implemented by the buck circuit when the output voltage of the external power supply is higher than 12V; or, the DC/DC converter is implemented by the SEPIC when the output voltage of the external power supply varies greatly.

BRIEF DESCRIPTION OF THE DRAWINGS

The detailed structure, operating principle and effects of the present disclosure will now be described in more details hereinafter with reference to the accompanying drawings that show various embodiments of the present disclosure as follows.

DETAILED DESCRIPTION OF THE INVENTION

Figure 1:
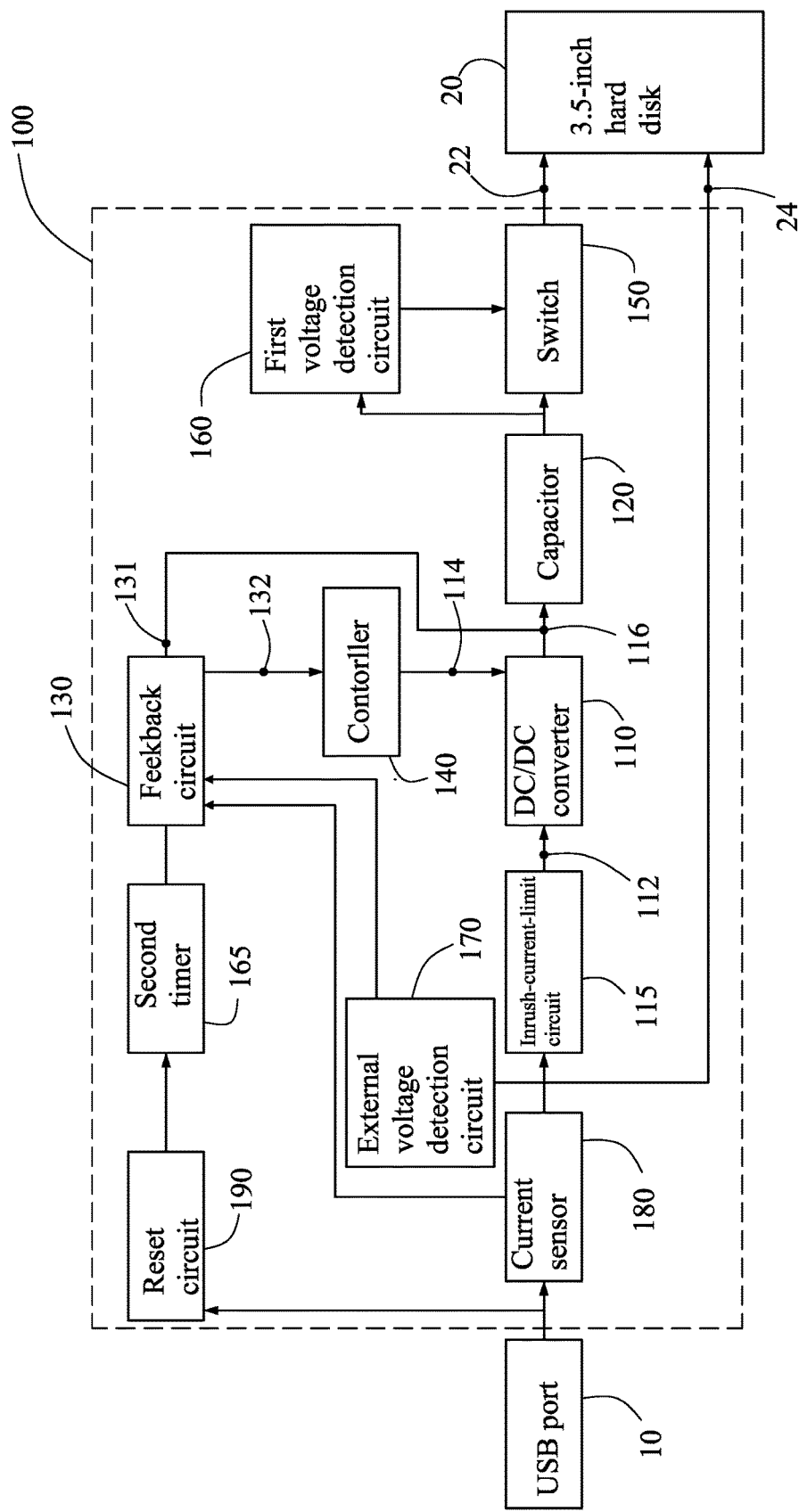
FIG. 1 is a schematic view of a first embodiment of a power converter of the present disclosure.

Reference will now be made in detail to the exemplary embodiments of the present disclosure, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this disclosure will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way. The same reference numbers are used in the drawings and the description to refer to the same or like parts.

It will be understood that, although the terms 'first', 'second', 'third', etc., may be used herein to describe various elements, these elements should not be limited by these terms. The terms are used only for the purpose of distinguishing one component from another component. Thus, a first element discussed below could be termed a second element without departing from the teachings of embodiments. As used herein, the term "or" includes any and all combinations of one or more of the associated listed items.

Please refer to FIG. 1 which shows a schematic view of a first embodiment of a power converter of the present disclosure. The power converter 100 is electrically connected between an external power supply and at least one electronic device. In the first embodiment, the external power supply may be a USB port 10 capable of outputting 5V (or up to 12V in a PD mode of a USB type C port). Preferably, the USB port 10 can be configured in a notebook computer, a desktop computer, or an All-In-One PC, or in a hub. In addition, the electronic device has peak current load characteristic, and it means that the electronic device consumes larger current in certain time period during operation. In the first embodiment, the electronic device may be a 3.5-inch hard disk 20 which has a first power-inputted terminal 22 and a second power-inputted terminal 24. The voltage required for the first power-inputted terminal 22 is higher than that for the second power-inputted terminal 24. In the first embodiment, the voltage inputted into the first power-inputted terminal 22 is required to be ranged from 10V to 13.5V, and this voltage range is the range from lowest to highest operation voltages which the 3.5-inch hard disk 20 can withstand in an instant. The rated operation voltage of the 3.5-inch hard disk 20 in a steady status is 12V. The voltage inputted into the first power-inputted terminal 22 is used for driving a motor (not shown in FIG. 1) of the 3.5-inch hard disk 20. When the motor of the 3.5-inch hard disk 20 is just started up, the higher startup voltage ranged about 13V to 13.5 V is applied to drive the motor. After the motor is operating into the steady status for a time period, the operation voltage applied to the motor can be reduced to 12V. In addition, the voltage inputted into the second power-inputted terminal 24 is required to be 5V, and the second power input terminal 24 is electrically connected to the USB port 10. The power inputted into the second power input terminal 24 is mainly used for driving a control circuit of the 3.5-inch hard disk 20.

Please refer to FIG. 1. The power converter 100 includes a DC/DC converter 110, a capacitor 120, a feedback circuit 130, a controller 140, a switch 150, a first voltage detection circuit 160 and a second timer 165. The DC/DC converter 110 has an input terminal 112 electrically connected to the USB port 10. In this embodiment, a current sensor 180 and an inrush-current-limit circuit 115 are disposed between the DC/DC converter 110 and the USB port 10. In this embodiment, the capacitor 120 is electrically connected to an output terminal 116 of the DC/DC converter 110. Preferably, the capacitor 120 may be a super-capacitor or an electrolytic capacitor. The feedback circuit 130 has an input terminal 131 electrically connected to the output terminal 116 of the DC/DC converter 110, and is configured to detect an output voltage of the DC/DC converter 110. The controller 140 has an output terminal electrically connected to the other input terminal 114 of the DC/DC converter 110, and an input terminal electrically connected an output terminal 132 of the feedback circuit 130. The feedback circuit 130 further has other input terminals respectively connected to the external voltage detection circuit 170 and the current sensor 180. The switch 150 has an input terminal electrically connected to an output terminal of the capacitor 120, and an output terminal electrically connected to a first power-inputted terminal 22 of the 3.5-inch hard disk 20.

In the embodiment shown in FIG. 1, when a plug (such as a USB connector, not shown in FIG. 1) electrically connected to the power converter 100, is plugged in the USB port 10, and the capacitor 120 storing no energy is equivalent to a short circuit, so the inrush-current-limit circuit 115 is needed to charge initial energy into the capacitor 120 by a manner of limiting the input current. Next, the DC/DC converter 110 is configured to boost the voltage outputted from the USB port 10 to a second preset voltage ranged from 13V to 13.5V and, in the meantime, charge the capacitor

120. While the capacitor 120 is being charged, the voltage of the capacitor 120 is gradually increased, and when the first voltage detection circuit 160 detects that the output voltage of the capacitor 120 or the input voltage of the switch 150 reaches the second preset voltage (that is, the voltage ranged from 13V to 13.5V in this embodiment), the first voltage detection circuit 160 drives the switch 150 into a conductive status. After the switch 150 is conductive, the capacitor 120 outputs power to the first power-inputted terminal 22 of the 3.5-inch hard disk 20, so as to support power to activate the 3.5-inch hard disk 20.

In conclusion, the power converter 100 includes the DC/DC converter 110 and the capacitor 120, so the 3.5-inch hard disk 20 can be operated without using the extra power supplier, compared to prior art. Moreover, compared with the Taiwan patent filing No. 101135837, the power converter 100 of this embodiment is provided with the capacitor rather than the battery, so the power converter 100 has higher safety. In addition, the capacitor 120 has a longer lifetime than the battery, so the power converter 100 of this embodiment has better endurance.

Please refer to FIG. 1. The second timer 165 stores a second preset time period, such as 10 seconds. After the power converter 100 and USB port 10 are electrically connected with each other, the second timer 165 starts to count, and when the counting time is longer than or equal to the second preset time period, the second timer 165 outputs an adjustment signal to the feedback circuit 130, and the feedback circuit 130 then reduces the output voltage of the DC/DC converter 110 to a first preset voltage through the controller 140, for example, the first preset voltage is 12V. Therefore, after the motor of the 3.5-inch hard disk 20 is started up by the higher input voltage 13V-13.5V and then enters the steady status, the output voltage of the DC/DC converter 110 is dropped to 12V for stably and continuously driving the motor of the 3.5-inch hard disk 20. In this embodiment, the second timer 165 starts to count after the power converter 100 and the USB port 10 are electrically connected with each other, but one of ordinary skill in the art can apply other reference. For example, the input terminal of the second timer 165 can be electrically connected to the output terminal of the DC/DC converter 110, and the second timer 165 can be configured to start counting after the output voltage of the DC/DC converter 110 reaches 13.5V.

In this embodiment, the reason why the output voltage of the DC/DC converter 110 is set as the second preset voltage of 13.5V and then dropped to the first preset voltage of 12V is described below. The storage energy of the capacitor 120 is proportional to square of the voltage of the capacitor 120, according to the function $E=0.5*C*V^2$, so the output voltage of the DC/DC converter 110 is set at an upper limit (such as 13.5V) of the operation voltage range of the 3.5-inch hard disk 20, to enable the capacitor 120 to store higher energy, and the output voltage of the DC/DC converter 110 is then dropped to a mean value (that is, 12V) of the operation voltage range to stably drive the motor of the 3.5-inch hard disk 20. The DC/DC converter 110 has the two-level output voltage, the output voltage is at the higher level in an initial status, and while the motor of the 3.5-inch hard disk 20 enters the steady status, the output voltage of the DC/DC converter is at the lower level. However, one of ordinary skill in the art can set the output voltage of the DC/DC converter 110 at the first preset voltage (that is, 12V) in the beginning, and when the first voltage detection circuit 160 detects that the output voltage of the capacitor 120 reaches the first preset voltage, the first voltage detection circuit 160 drives the switch 150 into the conductive status.

In addition, a reset circuit 190 is extra required to prevent from miscounting of the second timer 165 (or the first timer 260 shown in FIG. 2) and failure of normal startup of the hard disk during process of driving the motor of the 3.5-inch hard disk 20 because of the USB port 10 being continuously plugged in and pulled out. The reset circuit 190 has an input terminal electrically connected to an output terminal of the USB port 10, and an output terminal of the reset circuit 190 electrically connected to the second timer 165 (or the first timer 260 shown in FIG. 2). When detecting that the USB power is pulled out, the reset circuit 190 resets the second timer 165 (or the first timer 260 shown in FIG. 2).

In this embodiment, the current sensor 180 and the inrush-current-limit circuit 115 are disposed between the DC/DC converter 110 and the USB port 10. The capacitor 120 may not store energy before the USB port 10 is plugged in, and the capacitor 120 storing no energy is equivalent to short-circuit, and in the moment that the USB port 10 is directly plugged into the power converter 100, a higher inrush current, which the controller 140 is unable to response and process, may be occurred instantaneously, so a circuit (that is the inrush-current-limit circuit 115) configured to limit the inrush current must be disposed before the DC/DC converter 110. The inrush-current-limit circuit 115 also functions as a switch operative to extend the time from the cut-off status (with high impedance) to the conductive status (with low impedance), to stop the current from passing through instantaneously, so that the instantaneous inrush current can be limited. By means of using a switch operating in linear region, and under premise that power violent impulse (over-current) does not occur in the USB port, the inrush-current-limit circuit 115 can charge the capacitor 120 initially by the limited input current. When the input current is higher, the input voltage becomes lower due to the voltage drop resulted from losses in the connector and cable, so the inrush-current-limit circuit 115 can limit the inrush current by clamping the lowest input voltage, or limiting the input current, or combination thereof. In addition, in the present disclosure, the embodiment of the inrush-current-limit circuit 115 can be implemented in lower cost, for example, a temperature-coefficient resistor can be used to implement the inrush-current-limit circuit 115; alternatively, a current limiter or a voltage regulator can be used to implement the inrush-current-limit circuit 115.

Some commercially available electronic devices are provided with protection scheme for USB port 10. In the protection scheme, the magnitude of the current outputted from the USB port 10 is limited, and when the output current of the USB port 10 is too high, the USB port 10 stops supplying power. Moreover, the USB ports 10 of various brands of the NBs and PCs generally have different current limitations and protection scheme parameters.

In addition, the higher output current causes the higher voltage drop, which results in the lower voltage of the USB port 10. Therefore, the power converter 100 can further include an external voltage detection circuit 170 and a current sensor 180 to respond the situation. The external voltage detection circuit 170 and the current sensor 180 both are electrically connected between the feedback circuit 130 and the USB port 10. In this embodiment, an input terminal of the external voltage detection circuit 170 is electrically connected to an output terminal of the current sensor 180. In addition, the output terminal of the current sensor 180 is electrically connected to the inrush-current-limit circuit 115, and the output terminal 132 of the feedback circuit 130 is electrically connected to the controller 140.

Please refer to FIG. 1. When the current sensor 180 detects the output current of the USB port 10 higher than a current preset value, the current sensor 180 outputs an adjustment signal to the feedback circuit, and through the controller 140, the feedback circuit 130 controls the output voltage of the DC/DC converter 110 to drop, so that the magnitude of output current of the USB port 10 can be kept below a fixed value. Alternatively, when the external voltage detection circuit 170 detects the output voltage of the USB port 10 lower than a fixed value, the external voltage detection circuit 170 outputs an adjustment signal to the feedback circuit 130, and through the controller 140, the feedback circuit 130 controls the output voltage of the DC/DC converter 110 to drop, so that the output voltage of the USB port 10 can be kept above a fixed value. By means of the adjustment, the USB port 10 can be prevented from stopping operation or being abnormal when the output current of the USB port 10 is too high.

In greater detail, while the output voltage of the DC/DC converter 110 is being dropped, the output power of the DC/DC converter 110 is also being reduced, and power outputted from the USB port 10 and the input power of the DC/DC converter 110 are also reduced, so that the output power of the USB port 10 can be limited under a preset range. Even if the motor of the 3.5-inch hard disk 20 requires more power, the output power of the USB port 10 is still limited in the preset range and the energy stored in the capacitor 120 can be used to provide and compensate the extra power beyond the power supplied by the USB port 10. Preferably, the capacitor 120 has a volume sufficient for supplying the output voltage without dropping to below the lowest operation voltage of the electronic device.

Figure 2:
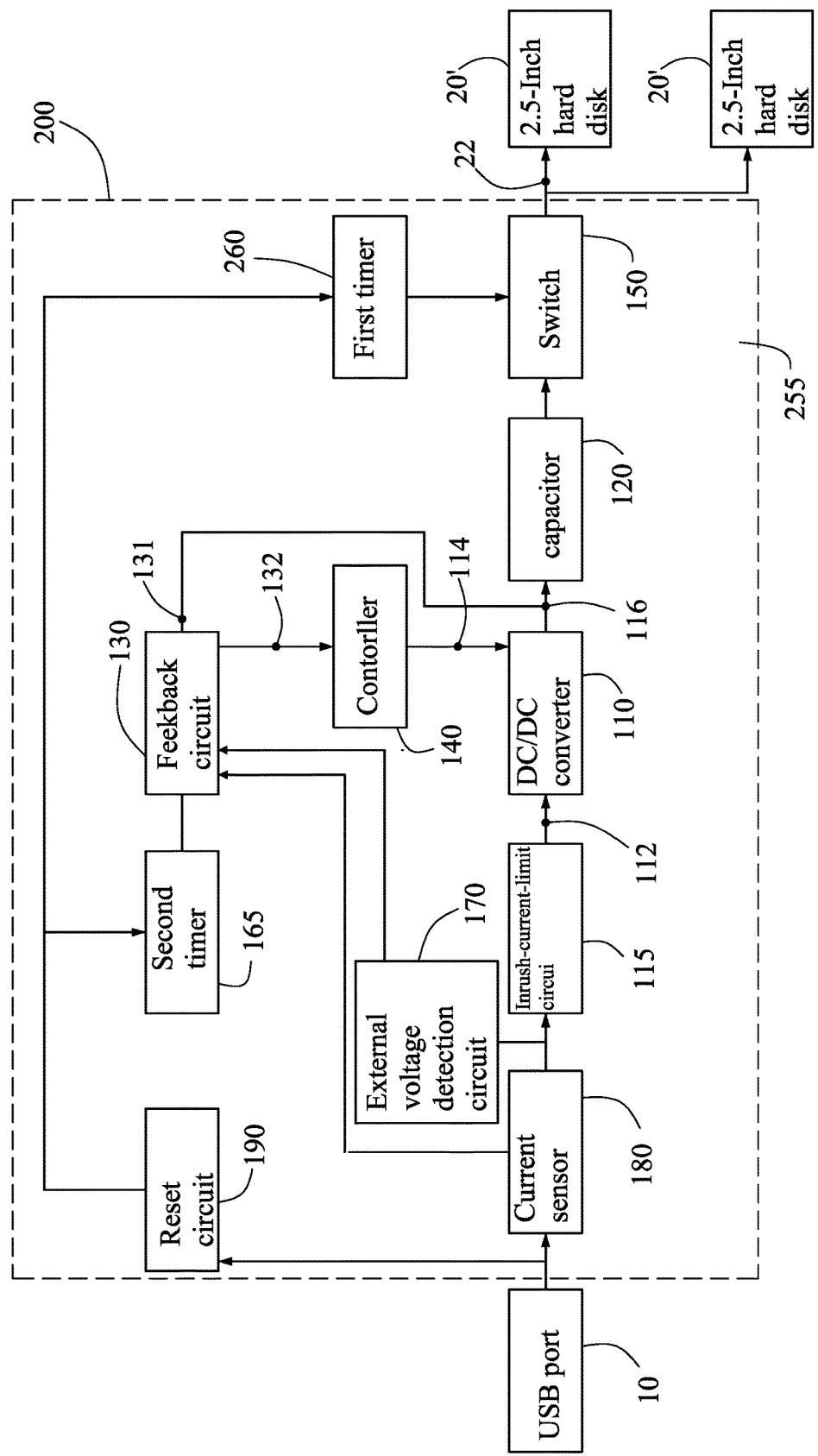
FIG. 2 is a schematic view of a second embodiment of the power converter of the present disclosure.

Please refer to FIG. 2 which shows a second embodiment of the power converter of the present disclosure. In FIG. 2, the components the same as that of FIG. 1 are marked with the same reference numbers and their descriptions are omitted. In the second embodiment, a first timer 260 is used to replace the first voltage detection circuit 160 of FIG. 1. The first timer 260 has an output terminal electrically connected to the input terminal of the switch 150, and an input terminal electrically connected to the reset circuit 190. In this embodiment, the power converter 200 is electrically connected to two 2.5-inch hard disks 20' which require great deal of power for startup. The second timer 165 is electrically connected to the USB port 10. After the power converter 200 and the USB port 10 are electrically connected with each other, the second timer 165 starts to count. Before the second timer 165 counts to the first preset time period (about 5 seconds), the USB port 10 is kept continuously charging the capacitor 120 to boost the voltage value of the capacitor 120 to a second preset voltage (about 5.8V) in a preset time period. After the second timer 165 counts to the first preset time period, the first timer 260 controls the switch 150 into the conductive status and the capacitor 120 is also charged up to 5.8V, so the capacitor 120 starts to provide energy to the two 2.5-inch hard disks 20' for startup. After the second timer 165 counts to the second preset time period, the second timer 165 triggers the controller 140 through the feedback circuit 130, to make the output voltage of the DC/DC converter 110 back to the 5V of level. In this embodiment, the first preset time period means the time period for the capacitor 120 being charged up to the second preset voltage, and the one of ordinary skill in the art can adjust the first preset time period and the second preset voltage upon practical demand.

Figure 3:
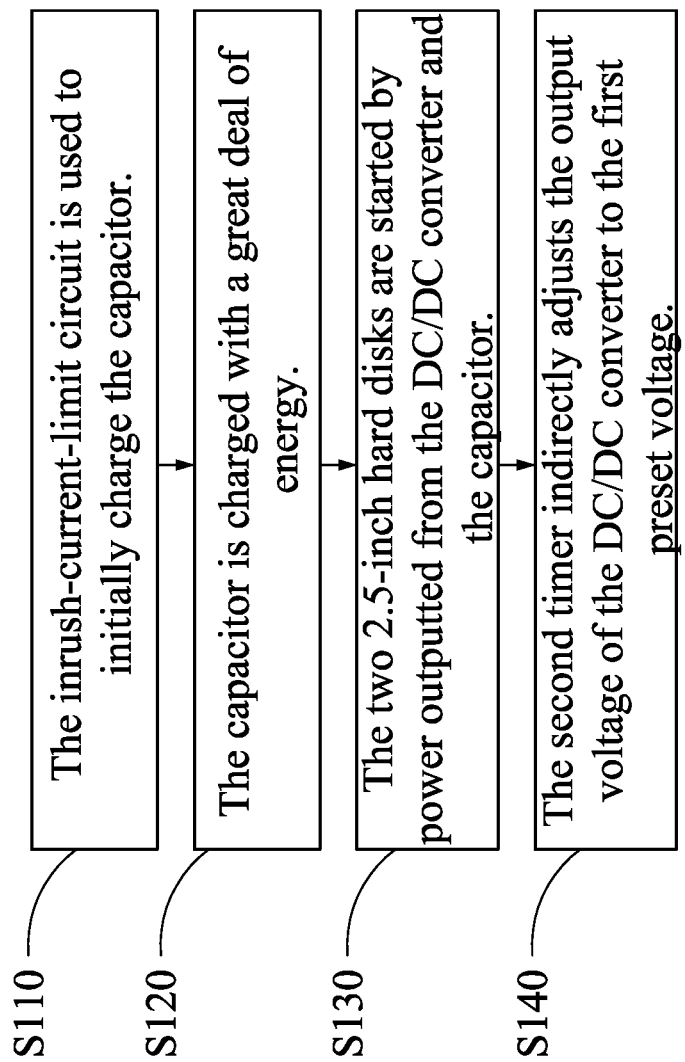
FIG. 3 is a flowchart of operating the second embodiment of the power converter of the present disclosure.

Please refer to FIG. 3 which shows a flowchart of operating the power converter of FIG. 2. The flow includes following steps.

In step S110, the inrush-current-limit circuit 115 is used to initially charge the capacitor 120, and the external voltage detection circuit 170 or/and the current sensor 180 continuously monitors and limits the output power of the USB port 10 to a preset range.

In the step S120, the DC/DC converter 110 is activated to boost the voltage which is inputted to the capacitor 120, up to the second preset voltage, so as to charge the capacitor 120 with a great deal of energy.

In the step S130, when the first timer 260 counts up to the first preset time period, the timer 260 controls the switch 150 into the conductive status, so as to start up the two 2.5-inch hard disks 20' by the power outputted from the DC/DC converter 110 and the capacitor 120.

In the step S140, when the second timer 165 counts up to a second preset time period, the two 2.5-inch hard disks 20 have entered the steady status, and the second timer 165 indirectly adjusts the output voltage of the DC/DC converter 110 to the first preset voltage.

It should be noted that the reset circuit 190 resets the first timer 260 and the second timer 165 when the USB port 10 and the power converter 200 are disconnected.

In the embodiments of FIGS. 1 and 2, the 3.5-inch hard disk and the two 2.5-inch hard disks are taken as examples of the electronic device, but one of ordinary skill in the art can use CD/DVD-ROM drive or the like as the embodiment of the electronic device. In addition, in the embodiment, the USB port is taken as the example of the external power supply, but one of ordinary skill in the art can support power over Ethernet, USB type C PD port, or other connector having both signal transmission and power supply functions, as the embodiment of the external power supply. Moreover, in the present disclosure, the DC/DC converter 110 can be omitted under certain condition, and a related embodiment will be described below.

Figure 4:
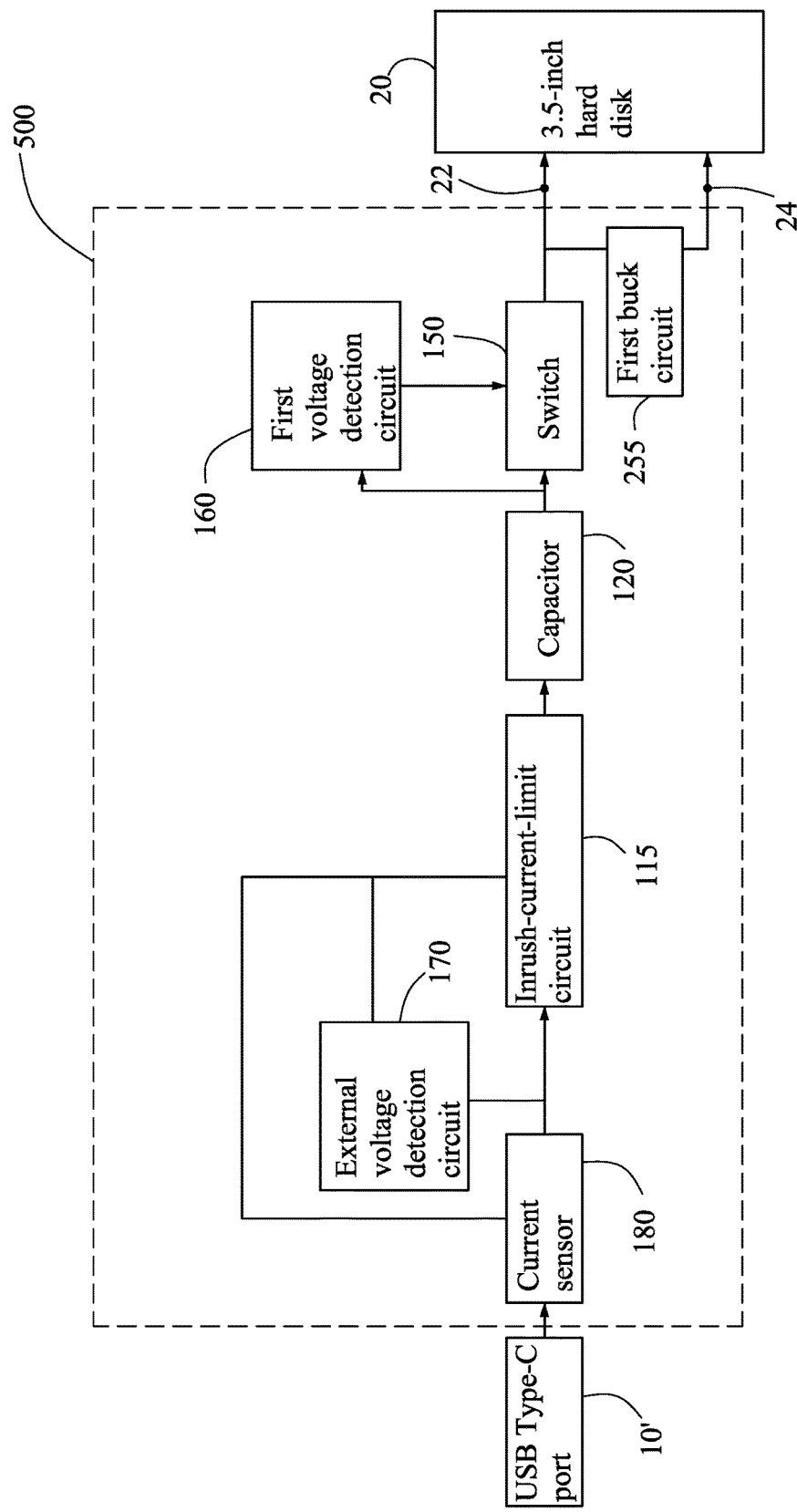
FIG. 4 is a schematic view of a third embodiment of the power converter of the present disclosure.
Figure 5:
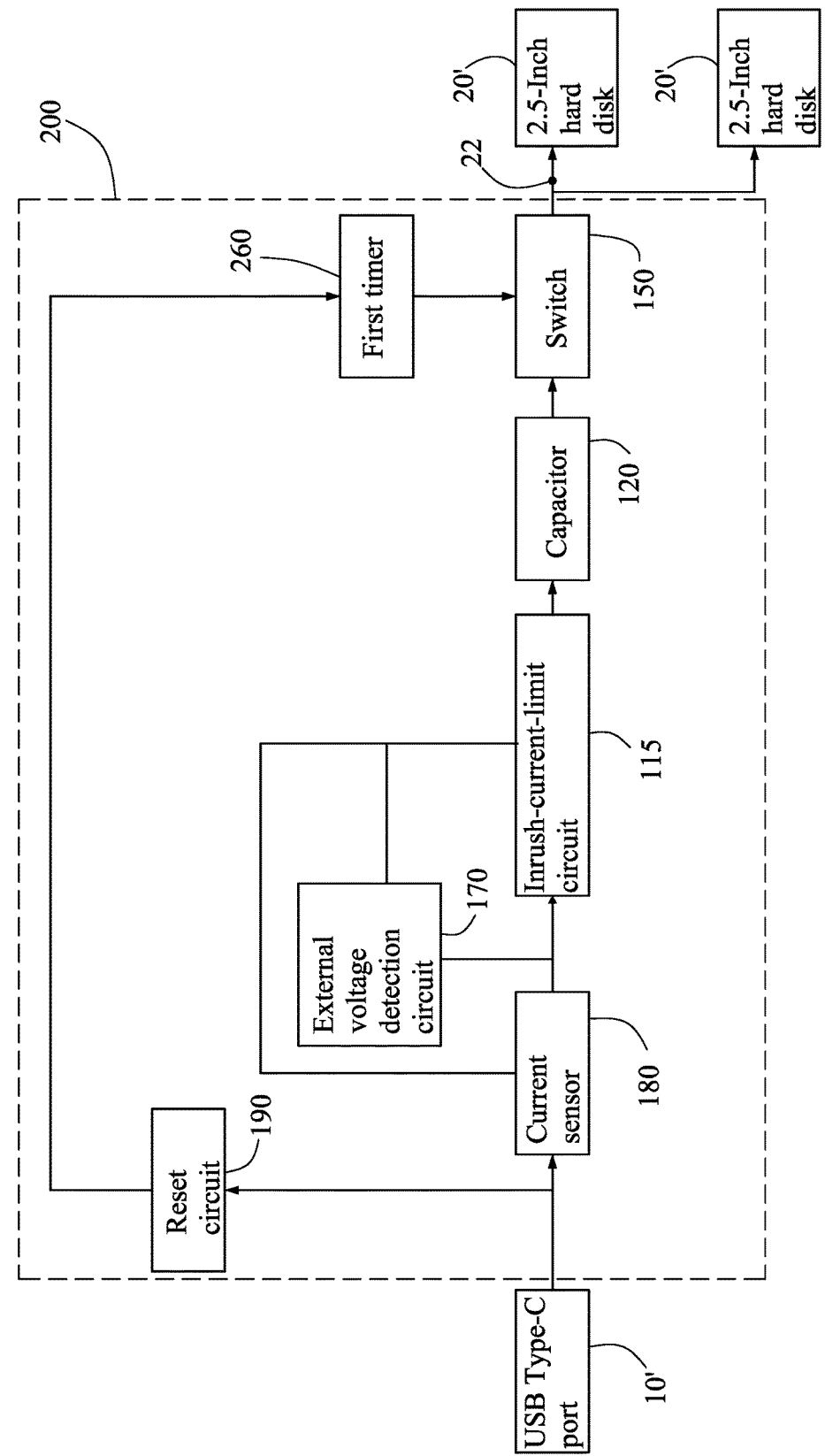
FIG. 5 is a schematic view of a fourth embodiment of the power converter of the present disclosure.

Please refer to FIGS. 4 and 5 which respectively show third embodiment and fourth embodiment of the power converter of the present disclosure. In FIG. 4 or FIG. 5, components the same as that of FIG. 1 or FIG. 2 are marked as the same reference number and their descriptions are omitted. In the third embodiment and fourth embodiment, the external power supply is a USB Type-C port 10'. The USB Type-C port 10' has an output voltage adjustable to 12V or 5V, and provides higher current than general non-Type-C USB port. 12V of voltage is within the operation voltage range for the first power-inputted terminal 22 of the 3.5-inch hard disk of FIGS. 4, and 5V of voltage is within the operation voltage range of the 2.5-inch hard disk of FIG. 5, so it is not necessary to dispose the DC/DC converter 110 in the power converters 500 and 600. In addition, the power converter 500 of FIG. 4 further includes a first buck circuit 255 which has an input terminal electrically connected to the output terminal of the switch 150 and an output terminal electrically connected a second power-inputted terminal 24 of the 3.5-inch hard disk 20.

In FIGS. 4 and 5, when the current sensor 180 detects the output current of the USB Type-C port 10' higher than a preset current, the current sensor 180 controls the inrush-current-limit circuit 115 to increase the conductive resistance thereof, that is, the output current of the USB Type-C port 10' is limited to not exceed the preset current, and the energy stored in the capacitor 120 can be used to supply the extra required power exceeding the power supplied by the USB Type-C port 10'.

In addition, in FIGS. 4 and 5, an external voltage detection circuit 170 can be used to detect the output voltage of the external power supply. When the output voltage of the USB Type-C port 10' is smaller than an external preset voltage, the external voltage detection circuit 170 controls the inrush-current-limit circuit 115 to increase the conductive resistance thereof, that is, the output voltage of the USB Type-C port 10' is clamped to be not lower than the external preset voltage, and the energy stored in the capacitor 120 can be used to supply the extra required power exceeding the power supplied by the USB Type-C port 10'.

Figure 6:
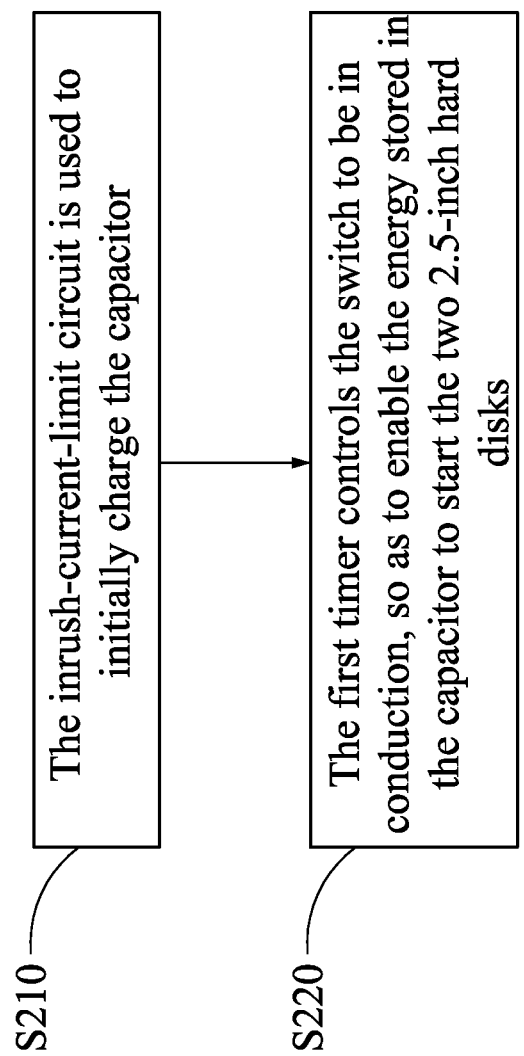
FIG. 6 is a flowchart of operating the fourth embodiment of the power converter of the present disclosure.

Please refer FIGS. 5 and 6. A flow of operating the power converter of FIG. 5 will be described below.

In a step S210, the inrush-current-limit circuit 115 is used to initially charge the capacitor 120, and the external voltage detection circuit 170 or/and the current sensor 180 continuously monitor and limit the output power of the USB Type-C port 10' under the preset range.

In a step S220, when the first timer 260 counts up to the first preset time period, the capacitor 120 stores a certain level of energy, so the first timer 260 controls the switch 150 to be in conduction, so as to enable the energy stored in the capacitor 120 to start up the two 2.5-inch hard disks.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A power converter, electrically connected between an external power supply and at least one electronic device with peak current load characteristic, and the electronic device having a first power-inputted terminal to which a voltage ranged in an operation voltage range is inputted, and the power converter comprising:
   a capacitor electrically connected to the external power supply;
   a switch having an input terminal electrically connected an output terminal of the capacitor, and an output terminal electrically connected to the first power-inputted terminal of the electronic device;
   an inrush-current-limit circuit electrically connected between the capacitor and the external power supply; and
   a first voltage detection circuit having an output terminal electrically connected to the switch and configured to detect an output voltage of the capacitor;
   wherein under a condition that the first voltage detection circuit detects the input voltage of the switch higher than or equal to a first preset voltage, the first voltage detection circuit is configured to drive the switch to be in a conductive status, so as to enable the capacitor to supply power to the first power-inputted terminal of the electronic device.

2. The power converter according to claim 1, further comprising a DC/DC converter electrically connected between the inrush-current-limit circuit and the capacitor.

3. The power converter according to claim 2, further comprising:
   a feedback circuit having an input terminal electrically connected to an output terminal of the DC/DC converter;
   a controller having an output terminal electrically connected to the other input terminal of the DC/DC converter, and an input terminal electrically connected to an output terminal of the feedback circuit;
   a second timer electrically connected to the feedback circuit and storing a second preset time period;
   a reset circuit having an output terminal electrically connected to the second timer, and an input terminal electrically connected to the external power supply, and configured to reset the second timer when the reset circuit detects the external power supply is removed;
   wherein before the second timer counts to the second preset time period, the output voltage of the DC/DC converter is adjusted to a second preset voltage, and when the second timer counts to the second preset time period, the second timer outputs an adjustment signal to the feedback circuit to reduce the output voltage of the DC/DC converter to the first preset voltage.

4. The power converter according to claim 2, further comprising:
   a feedback circuit having an input terminal electrically connected to an output terminal of the DC/DC converter;
   a controller having an output terminal electrically connected to the other input terminal of the DC/DC converter, and an input terminal electrically connected to an output terminal of the feedback circuit; and
   a current sensor electrically connected between the inrush-current-limit circuit and the external power supply, and having an output terminal electrically connected to the feedback circuit, and wherein under a condition that the current sensor detects that an output current of the external power supply is higher than a preset current, the output voltage of the DC/DC converter is reduced.

5. The power converter according to claim 2, further comprising:
   a feedback circuit having an input terminal electrically connected to an output terminal of the DC/DC converter;
   a controller having an output terminal electrically connected to the other input terminal of the DC/DC converter, and an input terminal of the controller electrically connected to an output terminal of the feedback circuit;
   an external voltage detection circuit electrically connected between the inrush-current-limit circuit and the external power supply, and having an output terminal electrically connected to the feedback circuit, and wherein under a condition that the external voltage detection circuit detects that the output voltage of the external power supply is lower than a preset external voltage, the output voltage of the DC/DC converter is reduced.

6. The power converter according to claim 2, wherein the DC/DC converter is a buck circuit, a boost circuit or a single-ended primary-inductance converter (SEPIC).

7. The power converter according to claim 1, further comprising:
   a current sensor electrically connected between the inrush-current-limit circuit and the external power supply, and having an output terminal electrically connected to an input terminal of the inrush-current-limit circuit, and wherein under a condition that the current sensor detects the output current of the external power supply larger than a preset current, the conductive resistance of the inrush-current-limit circuit is increased.

8. The power converter according to claim 1, further comprising:

an external voltage detection circuit electrically connected between the inrush-current-limit circuit and the external power supply, having an output terminal electrically connected to an input terminal of the inrush-current-limit circuit, wherein under a condition that the external voltage detection circuit detects the output voltage of the external power supply lower than an external preset voltage, the conductive resistance of the inrush-current-limit circuit is increased.

9. The power converter according to claim 1, wherein the inrush-current-limit circuit is a current limiter or a voltage regulator.

10. The power converter according to claim 1, further comprising a first buck circuit having an input terminal electrically connected to the output terminal of the switch, and an output terminal electrically connected to the second power input terminal of the electronic device.

* * * * *